United States Patent [19]
Kokel et al.

[11] Patent Number: 6,031,044
[45] Date of Patent: Feb. 29, 2000

[54] POLYURTHANES WITH COVALENTLY BONDED PHOTOINITIATOR UNITS

[75] Inventors: Nicolas Kokel; Harald Larbig; Klaus Menzel, all of Ludwigshafen; Erich Beck, Ladenburg; Wolfgang Reich, Maxdorf; Guido Voit, Schriesheim, all of Germany

[73] Assignee: BASF Aktiengesellschaft, Ludwigshafen, Germany

[21] Appl. No.: 08/993,016

[22] Filed: Dec. 18, 1997

[30] Foreign Application Priority Data

Dec. 19, 1996 [DE] Germany ............... 196 53 183

[51] Int. Cl.$^7$ ................. C08J 3/00; C08K 3/20; C08L 75/00; C08F 2/46
[52] U.S. Cl. .............. 524/839; 427/487; 427/372.2; 427/385.5; 427/508; 427/520; 428/423.1; 522/35; 522/38; 522/39; 522/90; 522/96; 522/97; 524/507; 524/591; 524/840; 525/123; 525/455
[58] Field of Search ............ 428/423.1; 524/591, 524/839, 840, 507; 427/487, 508, 520, 372.2, 385.5; 522/35, 38, 39, 90, 96, 97; 525/123, 455

[56] References Cited

U.S. PATENT DOCUMENTS

| | | | |
|---|---|---|---|
| 4,357,221 | 11/1982 | Lehner et al. | 204/181 R |
| 5,135,963 | 8/1992 | Haeberle | 522/84 |
| 5,532,112 | 7/1996 | Koehler et al. | 430/281.1 |
| 5,744,512 | 4/1998 | Kohler et al. | 522/34 |

FOREIGN PATENT DOCUMENTS

| | | |
|---|---|---|
| 30 05 034 | 8/1981 | Germany . |
| 37 38 567 A1 | 9/1988 | Germany . |
| 39 11 827 A1 | 10/1990 | Germany . |
| 40 31 732 A1 | 4/1992 | Germany . |
| 42 03 546 | 8/1993 | Germany . |
| WO 96/08524 | 3/1996 | WIPO . |

*Primary Examiner*—Patrick D. Niland
*Attorney, Agent, or Firm*—Oblon, Spivak McClelland, Maier & Neustadt, P.C.

[57] ABSTRACT

A polyurethane which is substantially self-dispersible in water and is obtainable by reacting a) at least one polyisocyanate with
b) at least one polyol and
c) at least one photoinitiator of the general formula I

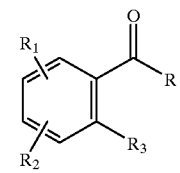

(I)

where R is a radical of the formula II

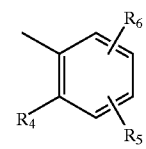

(II)

or is —$CR^7R^8R^9$, $P(=O)(R^{10})_2$ or $SO_2R^{11}$,
the number-average molecular weight $M_n$ of the polyurethane being greater than 2700, and its use. The invention also relates to aqueous polyurethane resin dispersions and coating compositions comprising the novel polyurethanes, and to their use.

23 Claims, No Drawings

POLYURTHANES WITH COVALENTLY BONDED PHOTOINITIATOR UNITS

The invention relates to a water-soluble and/or water-dispersible polyurethane (PU) having photoinitiator units bonded covalently to the PU chain, to a process for preparing such a polyurethane, to aqueous solutions and/or dispersions comprising such a polyurethane, and to a process for preparing such an aqueous polyurethane dispersion.

Aqueous dispersions of polyurethanes are known (see for example D. G. Oertel "Kunststoff Handbuch 7", 2nd Edition, Carl Hanser Verlag Munich/Vienna, pp. 24 to 25 and pp. 571 to 574. These water-dispersed polyurethanes are used as binders (also referred to below as PU binders) in, for example, coating compositions for painting, printing, bonding or otherwise coating substrates. The coatings obtainable in this way usually show a favorable combination of properties in respect of adhesion, abrasion resistance, low-temperature flexibility, toughness and gloss.

For the purposes of the invention the term coating compositions refers to ready-to-use dispersions of the PU binders in question, together if appropriate with further additives. A coating for the purposes of the invention is either a surface-sealing layer (generally a coat) or an adhesive bond, unless specified otherwise. Therefore, an aqueous polyurethane dispersion can be either the aqueous dispersion of the PU binders or (if the dispersion is ready to use to prepare a coating without the addition of further additives) a coating composition in the above sense.

A further advantage of the aqueous polyurethane dispersions lies in the substantial absence of organic solvents, which makes them ecologically advantageous alternatives to known, solvent-containing coating or adhesive systems.

A disadvantage of the PU binders dispersed in aqueous solution is the mandatory presence of emulsifiers or hydrophilicizing groups. This greatly reduces the resistance of the coating or bond to, for instance, water, solvents, acids, alkalis, surfactants or other household chemicals. Long-term action of the abovementioned chemicals on a coating leads at least to a reduction in its quality and possibly even to its complete destruction.

In order to solve this problem the attempt has been made to render aqueous polyurethane dispersions of PU binders having radiation-crosslinkable groups (in general, olefinically unsaturated double bonds) UV-crosslinkable by the addition of low molecular mass photoinitiators.

Thus DE-A1 30 05 034 describes the preparation of coatings on electrically conductive articles, where the PU binder contains olefinically unsaturated double bonds. To crosslink the polyurethane dispersion, a low molecular mass photoinitiator is added which is stirred into the dispersion.

DE-A1 39 11 827 likewise describes aqueous polyurethane dispersions where the PU binder contains olefinically unsaturated double bonds. For crosslinking the dispersion by UV radiation, a low molecular mass photoinitiator is added.

DE-A1 40 31 732 and DE-A1 42 03 546 again relate to radiation-curable PU binders where in each document a low molecular mass photoinitiator is added to the aqueous polyurethane dispersion.

A disadvantage of all of the techniques disclosed is that the photoinitiator and/or, if appropriate, fragmentation residues thereof are not bound in the binder matrix in such a way as to be stable to diffusion after crosslinking by UV radiation. In some circumstances, these low molecular mass constituents can diffuse to the surface of the coating. Such fragmentation products often give the coating an unpleasant odor. In some cases the fragmentation products can even be toxic. Also disadvantageous is the softening effect of such low molecular mass additives on the mechanical properties of the coating.

A further serious disadvantage arising from the addition of low molecular mass photoinitiators for crosslinking the olefinically unsaturated double bonds of the polyurethanes lies in the deficient recyclability of the coating compositions by, for example, the ever more frequently employed technique of ultrafiltration.

In this technique, the overspray is washed out with water from the exhaust air from a spraybooth and the resulting water, enriched with coating composition, is subjected to ultrafiltration until the composition of the aqueous dispersion corresponds again to the coating composition employed originally.

With this technique, however, all constituents of the original coating composition which fall below a certain molecular weight accummulate in the circulation water and are therefore removed from the coating composition. This process also affects the low molecular mass photoinitiators employed to date. As a result of the continuous associated decrease in the concentration of low molecular mass photoinitiator in the coating composition, as the period of ultrafiltration progresses there is a markedly reduced reactivity in the applied coating in terms of crosslinking by irradiation. This loss of reactivity can in general only be countered by subsequently adding more photoinitiator.

The radiation-curable, polyurethane-based coating compositions known from the prior art are therefore unable, or not sufficiently able, to meet the heightened performance expectations.

The prior art has also disclosed polyurethanes which may comprise photoinitiators as a constituent bonded covalently to the polyurethane chain.

WO 96/08524, although disclosing sidechain-functionalized aqueous polyurethane dispersions whose functionalization can comprise photoinitiators, does not disclose any photoinitiators suitable for incorporation into the polyurethane. Moreover, functionalization takes place by way of carbodiimide groups, which necessitates a laborious synthesis prior to incorporation into the polyurethane.

DE-A1 37 38 567 discloses a polyurethane mixture in which a photoinitiator capable of reaction with polyurethanes is added to the polyisocyanates before the thermal polyaddition reaction. However, no aqueous PU binders are described, and the system is irradiated prior to thermal aftercuring.

The prior art therefore discloses no water-soluble or water-dispersible polyurethane binders which comprise covalently bonded photoinitiators and can be prepared, simply, using known methods of polyurethane synthesis.

It is an object of the present invention, therefore, to provide PU binders comprising photoinitiators incorporated covalently in the binder. The PU binders should, from aqueous solutions or dispersions and by thermal drying alone, lead to tack-free, mechanically stable coatings and should be photochemically crosslinkable by irradiation at any subsequent point in time.

We have found that this object is achieved by a polyurethane which is substantially self-dispersible in water and has a number-average molecular weight $M_n$ of more than 2700, which is attainable by reacting a) at least one polyisocyanate with b) at least one polyol consisting of b1) from 9 to 100 mol-% of a polyol or of a mixture of two or more polyols having a molecular weight of at least 500 and b2) from 0 to 91 mol-% of a polyol or of a mixture of two or more polyols having a molecular weight of less than 500, b1) and b2) together making up 100 mol-% of component b), and c) at least one photoinitiator of the formula I

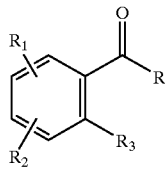

(I)

where R is a radical of the formula II

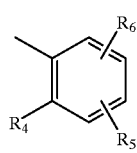

(II)

or is —$CR^7R^8R^9$, $P(=O)(R^{10})_2$ or $SO_2R^{11}$ and at least one of the radicals $R^1$, $R^2$, $R^5$, $R^6$ and $R^9$ is used for incorporation into the polyurethane and the remaining radicals, one or more of $R^1$, $R^2$, $R^5$, $R^6$ and $R^9$, each independently are hydrogen, $C_{1-12}$-alkyl, $C_{1-2}$-alkoxy, halogen, cyano, nitro or sulfo, $R^3$ and $R^4$ each independently are hydrogen or COOH or together are S, $R^7$ and $R^8$ each independently are hydrogen, $C_{1-12}$-alkyl, $C_{1-12}$-alkenyl, $C_{1-12}$-alkoxy or phenyl or together are =O or $C_{2-6}$-alkylene, $R^9$ is $OR^{11}$, $N(R^{11})_2$, N-piperidyl, N-piperazyl or N-morpholino, $R^{10}$ is $C_{1-12}$-alkyl, $C_{1-12}$-alkanoyl, phenyl or benzoyl, each of which can in turn be substituted by halogen, $C_{1-12}$-alkyl or $C_{1-12}$-alkoxy, $R^{11}$, independently at each occurrence, is hydrogen or is unsubstituted or OH—, $NHR^{10}$—, $NH_2$— or SH-substituted $C_{1-6}$-alkyl, $C_{1-12}$-alkoxy or phenyl, or together are $C_{2-5}$-alkylene, (and, if $R^9$ is $OR^{11}$ and $R^{11}$ is hydrogen, $R^7$ and $R^8$ in combination cannot be hydrogen and phenyl.

If desired, one or more of the following components may be present during the reaction:

d) a polyamine or a mixture of two or more polyamines, e) a compound or a mixture of two or more compounds having at least one isocyanate-reactive group and at least one group which is ionizable by addition of base or acid or by quaternization, f) a compound or a mixture of two or more compounds having at least one isocyanate-reactive group and at least one olefinically unsaturated double bond.

The term polyurethane essentially self-dispersible in water refers for the purposes of the invention to a polyurethane which can be dispersed stably in water merely by adding a small amount, if any, of dispersing aids. The novel polyurethanes require addition of dispersing aids in an amount of at most about 5% by weight, preferably less than 3% by weight and, with particular preference, less than 1% by weight, based on the solids content of the dispersion and, in particular, on the mass of the PU binders in the dispersion.

For the purposes of the present invention the term drying refers to the reduction in the solvent content of the coating until a tack-free, mechanically stable surface is obtained, the term solvent referring both to organic solvents and water as continuous phase.

Organic solvents can be present in the novel polyurethane dispersions in minor amounts, for example in an amount of not more than about 10% by weight, preferably less than about 7% by weight and, with particular preference, less than about 5% by weight, based on the overall dispersion.

As component a) for preparing the novel polyurethanes, the polyisocyanates commonly employed in polyurethane chemistry are suitable.

Those which can be mentioned in particular are diisocyanates $X(NCO)_2$ where X is an aliphatic hydrocarbon radical of 4 to 12 carbons, a cycloaliphatic or aromatic hydrocarbon radical of six to fifteen carbons or an araliphatic hydrocarbon radical of seven to fifteen carbon. Examples of such diisocyanates are tetramethylene diisocyanate, hexamethylene diisocyanate (HDI), dodecamethylene diisocyanate, 1,4-diisocyanatocyclohexane, 1-isocyanato-3,3,5-trimethyl-5-isocyanatomethylcyclohexane (IPDI), 2,2-bis-(4-isocyanatocyclohexyl)propane, trimethyihexane diisocyanate, 1,4-diisocyanatobenzene, 2,4-diisocyanatotoluene, 2,6-diisocyanatotoluene, 4,4'-diisocyanatodiphenylmethane, tetramethylxylylene diisocyanate, 2,4'-diisocyanatodiphenylmethane, p-xylylene diisocyanate, the isomers of bis(4-isocyanatocyclohexyl)methane, such as the trans/trans, the cis/cis and the cis/trans isomer, and mixtures of these compounds.

Particularly important mixtures of these isocyanates are the mixtures of the respective structural isomers of diisocyanatotoluene and diisocyanatodiphenylmethane; the mixture comprising 80 mol-% 2,4-diisocyanatotoluene and 20 mol-% 2,6-diisocyanatotoluene is particularly suitable. Also of particular advantage are the mixtures of aromatic isocyanates, such as 2,4-diisocyanatotoluene or 2,6-diisocyanatotoluene or a mixture of both, with aliphatic or cycloaliphatic isocyanates, such as HDI or IPDI, the preferred ratio of aliphatic to aromatic isocyanates being from about 4:1 to 1:4.

As component a) it is also possible to employ isocyanates which in addition to the free isocyanate groups carry further capped isocyanate groups, for example urethane groups.

If desired it is also possible to use those isocyanates which carry only one isocyanate group. In general the proportion of such isocyanates is not more than 10 mol-%, based on the overall molar amount of the monomers. The monoisocyanates may carry further functional groups, such as olefinically unsaturated groups or carbonyl groups, in which case they serve to introduce these functional groups into the polyurethane. They may enhance the dispersing or crosslinking or other polymer-analogous reactions of the polyurethane or may even make such operations or reactions possible. Examples of suitable such compounds are those such as isopropenyl α,α-dimethylbenzyl isocyanate (TMI).

In order to prepare polyurethanes having a certain degree of branching or of crosslinking it is possible, for example, to employ isocyanates having a functionality of three or more. Such isocyanates are obtained, for example, by reacting difunctional isocyanates with one another in such a way that some of their isocyanate groups are derivatized to form allophanate, biuret or isocyanurate groups. Examples of customary commercial compounds are the isocyanurate and the biuret of hexamethylene diisocyanate.

Examples of other suitable polyisocyanates of higher functionality are those that have urethane groups and are based on 2,4- or 2,6-diisocyanatotoluene or a mixture of both, IPDI, tetramethylene diisocyanate or hexamethylene diisocyanate on the one hand and on low molecular mass polyhydroxy compounds such as trimethylolpropane on the other.

In view of the processability of the polyurethanes, the proportion of trifunctional or higher polyfunctional polyisocyanates should be restricted. Thus their proportion should be limited to about 50% by weight, preferably less than about 35% by weight and, with particular preference, less than about 25% by weight.

Suitable components b) are polyols of relatively high molecular mass, preferably diols, which have a molecular weight of more than 500, for example from about 500 to 5000, preferably from about 1000 to 3000 g/mol. These polyols are referred to below as polyols b1) and are primarily responsible for good film formation and elasticity.

The polyols of component b1) are, in particular, polyester polyols known, for example, from Ullmanns Encyklopädie der technischen Chemie, 4th ed., vol. 19, pp. 62–65. Preference is given to the use of polyester-polyols which are obtained by reacting dihydric alcohols with polycarboxylic acids (preferably dibasic carboxylic acids). In place of the free polycarboxylic acids it is also possible to use the corresponding polycarboxylic anhydrides or corresponding polycarboxylic esters of lower alcohols, or mixtures thereof, to prepare the polyesterpolyols. The polycarboxylic acids, their esters and anhydrides are also referred to below as component b1.1). The polycarboxylic acids may be aliphatic, cycloaliphatic, araliphatic, aromatic or heterocyclic and may be unsubstituted or substituted, for example by halogens, and/or unsaturated. Examples of such compounds are suberic, azelaic, phthalic, isophthalic and terephthalic acid, phthalic, tetrahydrophthalic, hexahydrophthalic, tetrachlorophthalic, endomethylenetetrahydrophthalic and glutaric anhydride, maleic acid, maleic anhydride, fumaric acid or dimeric fatty acids. The polycarboxylic acids specified can be employed either as exclusive acid component or in a mixture with one another to synthesize component b1). Preference is given to the carboxylic acids of the formula HOOC—$(CH_2)_y$—COOH, where y is 1–20, preferably 2–20, examples being succinic, adipic, dodecanedicarboxylic and sebacic acid. In place of the free polycarboxylic acids it is possible, where feasible, also to use as component b1.1) the corresponding polycarboxylic anhydrides or corresponding polycarboxylic esters of lower alcohols, or mixtures thereof, to prepare the polyesterpolyols.

Examples of suitable polyhydric, preferably dihydric, alcohols as component b1.2) for reaction with the polycarboxylic acid component to synthesize component b1) are ethylene glycol, 1,2-propanediol, 1,3-propanediol, 1,3-butanediol, 1,4butenediol, 1,4butynediol, 1,5-pentanediol, 1,6-hexanediol, neopentylglycol, bis(hydroxymethyl) cyclohexanes, such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycols, dibutylene glycol and polybutylene glycols. Preference is given to neopentylglycol and to alcohols of the formula HO—$(CH_2)_x$—OH, where x is 1–20, preferably 2–20, examples being ethylene glycol, 1,4-butanediol, 1,6-hexanediol, 1,8-octanediol and 1,12-dodecanediol.

Also suitable, furthermore, are polycarbonatediols as can be obtained, for example, by reacting phosgene with an excess of the low molecular mass alcohols (b1.2)) mentioned as structural components for the polyester-polyols.

Lactone-based polyesterdiols are also suitable as component b1), these being homopolymers or copolymers of lactones; preferably adducts, containing terminal hydroxyl, of lactones with suitable difunctional starter molecules. Preferred lactones are those derived from compounds of the formula HO—$(CH_2)_z$—COOH, where z is 1–20. Examples are ε-caprolactone, β-propiolactone, γ-butyrolactone and/or methyl-ε-caprolactone and mixtures thereof. Examples of suitable starter components are the low molecular mass diols mentioned above as structural components for the polyesterpolyols. The corresponding polymers of ε-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids corresponding to the lactones.

The polyesterpolyols can also be synthesized from minor amounts of monofunctional or higher polyfunctional monomers or a mixture of both.

Other suitable monomers b1) are polyetherdiols. They are obtainable in particular by polymerizing ethylene oxide, propylene oxide, butylene oxide, tetrahydrofuran, styrene oxide or epichlorohydrin with itself, for example in the presence of $BF_3$, or by carrying out addition reactions of these compounds, individually, as a mixture or in succession, with starter components containing reactive hydrogens, such as water, alcohols or amines, for example ethylene glycol, 1,2-propanediol, 1,3-propanediol, 2,2-bis (4-hydroxydiphenyl)propane or aniline. Particular preference is given to polytetrahydrofuran having a molecular weight from about 500 to about 4000, preferably from about 500 to about 3000.

Both when preparing the polyesterpolyols and when preparing the polyetherpolyols it is possible to employ alcohols having a functionality of more than two in minor amounts as component b1.3). Particular examples of such compounds are trimethylolpropane, pentaerytritol, glycerol, sugars, for example glucose, oligomerized polyols, for example dimeric or trimeric ethers of trimethylolpropane, glycerol or pentaerythritol. The above compounds are likewise suitable as starter components for synthesizing the polyetherpolyols.

The polyol compounds having a functionality >2 are preferably used only in minor amounts for synthesizing the polyesterpolyols and/or polyetherpolyols.

Likewise suitable as component b1) are polyhydroxyolefins, preferably those having two terminal hydroxyls, for example α,ω-dihydroxypolybutadiene, α,ω-dihydroxypolymethacrylates or α,ω-dihydroxypolyacrylates.

The polyols listed under component b1) can also be employed in the form of mixtures of two or more thereof in any desired proportions.

The hardness and modulus of elasticity of the polyurethanes can in general be increased if the polyols b2) include not only the polyols b1) but also low molecular mass diols or polyols, preferably diols, b2) having a molecular weight of less than about 500, preferably from 62 to about 500 and, with particular preference, from 62 to about 200 g/mol.

As component b2) use is made in particular of the short-chain alkanediols referred to as component b1.2), preference being given to neopentylglycol and to unbranched diols having 2 to 12 C atoms and an even number of C atoms, examples being ethylene glycol, 1,4butanediol or 1,6-hexanediol. If desired, component b2) can also include, in minor amounts, alcohols having a higher functionality with respect to isocyanates, as have been described, for example, as component b1.3).

The components b1) and b2) described for synthesizing the novel polyurethanes can also be employed as mixtures of b1) and b2) for the purposes of the invention. In this case the proportion of the polyols b1), based on the overall amount of polyols b1) plus b2), is from 9 to 100 mol-% and the proportion of the polyols b2), based on the overall amount of polyols b1) plus b2), is from 0 to 91 mol-%. The ratio of the polyols b2) to the polyols b1) is preferably from 10:1 to 0:1, with particular preference from 8:1 to 0:1.

Component c) used to prepare the novel polyurethane comprises photoinitiators of the formula I whose radicals have already been defined above.

The compounds of the formula I carry at least one functional group which, possibly in its derivatized form, serves to incorporate the photoinitiator into the polyurethane. All functional groups which enable such incorporation to take place are suitable for use in the context of the present invention. Particular such groups are either isocyanate groups or functional groups that carry an acidic hydrogen which can be determined by the Zerewittinoff Test, examples being hydroxyl, mercaptan, primary or secondary amino or carboxyl groups.

In addition to the abovementioned groups the radicals $R^1$, $R^2$, $R^5$, $R^6$ and/or $R^9$ can also be radicals of structure A-X where X is a functional group which serves for incorporation into the polyurethane and A is $C_{1-12}$-alkyl or an alkanoyl, aryl or aryloxy radical.

Components c) of the formula I contain from 1 to 4, preferably from I to 3 and, with particular preference, 1 or 2 radicals $R^1$, $R^2$, $R^5$, $R^6$ or $R^9$ which have a functional group serving for incorporation into the poly-urethane.

Where R is a phenyl ring which is unsubstituted or substituted by $R^4$, $R^5$ and $R^6$, the resulting photoinitiators are of the benzophenone series. Where $R^3$ and $R^4$ together then form a sulfide bridge between the phenyl rings, the resulting photoinitiators are thioxanthones.

If R is the group —$CR^7R^8R^9$ then the resulting photoinitiator basic structures, in accordance with the above definitions of $R^7$, $R^8$ and $R^9$, are those of the benzoin ethers and acyloin ethers, of the benzil ketals and dialkoxyacetophenones, of the hydroxy- and aminoalkylphenones and of the α-sulfonyl ketones.

If R is —C(=O)$R^9$, then in accordance with the above definition of $R^9$ the resulting low molecular mass photoinitiators are those of the phenylglyoxylic ester or phenylglyoxylic amide series.

If R is —P(=O)$(R^{10})_2$ then the resulting photoinitiators belong to the class of the acylphosphine oxides.

The following compounds are particularly suitable for use as component c) in the novel polyurethanes:

2-, 3-and 4-hydroxybenzophenone, 2-hydroxy-5-methylhydroxybenzophenone, 2-hydroxy-4-methoxybenzophenone, 2-hydroxy-4-octyloxybenzophenone, 2-hydroxy-4-dodecyloxybenzophenone, 2-hydroxy-5-chlorohydroxybenzophenone, 2-hydroxy-4-methoxy-4'-methylbenzophenone, 2-hydroxy-4-methoxy-4'-chlorobenzophenone, 4-hydroxy-3-methylbenzo-phenone, 4-hydroxy-4'-methoxybenzophenone, 4-hydroxy-4'-chlorobenzophenone, 4-hydroxy-4'-fluorobenzophenone, 4-hydroxy-4'-cyanobenzophenone, 4-hydroxy-2',4'-dimethoxybenzophenone, 2,2',4,4'- and 2,4-dihydroxybenzophenone, 4-tert-butyl-2,4-dihydroxybenzophenone, 2,2'-dihydroxy-4-methoxybenzophenone, 2,2'-dihydroxy-4-octoxybenzophenone, 2,2'-dihydroxy-4,4'-dimethoxybenzophenone, 2,4,4'-, 2,3,4- and 2,4,6-trihydroxybenzophenone, 2,2,'-, 4,4'-, 2,3,4,4'- and 2,3',4,4'-tetrahydroxybenzophenone, 2-, 3- and 4-aminobenzophenone, 2-amino-4-methylbenzophenone, 2-amino-6methylbenzophenone, 2-amino-4'-methylbenzophenone, 2-amino-4'-chloro-5-fluorobenzophenone, 2-amino-5-chlorobenzophenone, 2-amino-5-bromobenzophenone, 2-amino-5-methylbenzophenone, 2-amino-N-ethylbenzophenone, 2-amino-2',5'-dimethylbenzophenone, 4amino-2-chlorobenzophenone, 4-amino-4'-methoxybenzophenone, 3,4-, 4,4'- and 3,3'-diaminobenzophenone, 4,4'-bis(methylamino)benzophenone, 3,3',4,4'-tetraaminobenzophenone, 2-, 3- and 4-benzoylbenzoic acid, 2-benzoyl-3'-methylbenzoic acid, 2-benzoyl-4'-ethylbenzoic acid, 2-benzoyl-3,6-dimethylbenzoic acid, 2-benzoyl-2',6'-dimethylbenzoic acid, 2-benzoyl-3',4'-dimethylbenzoic acid, 2-benzoyl-2',4',6-dimethylbenzoic acid, 2-benzoyl-p-hydroxybenzoic acid, 2-benzoyl-4'-methyl-3'-chlorobenzoic acid, 2-benzoyl-6-chlorobenzoic acid, 4-benzoyl-4'-isopropylbenzoic acid, 4-benzoyl-4'-chlorobenzoic acid, 4-benzoyl-4'-(2-carboxypropyl)benzoic acid, 2,4-, 3,4- and 4,4'-benzophenonedicarboxylic acid, 2',3,4-, 3,3',4- and 3,4,4'-benzophenonetricarboxylic acid, 3,3',4,4'-benzophenonetetracarboxylic acid and -tetracarboxylic dianhydride, 2-hydroxy-4-methoxy-5-sulfobenzophenone, 4-(4-carboxyphenyloxy)benzophenone, 4-(3,4-bis(carboxy)phenyloxy)benzophenone and the corresponding anhydride, 4'-(4-carboxyphenyloxy)benzophenone4carboxylic acid, 4'-(4-carboxyphenyloxy)benzophenone-3,4-dicarboxylic acid and the corresponding anhydride, 4'-(3,4-bis(carboxy)phenyloxy)benzophenone-2,4- and 3,4-dicarboxylic acid and the corresponding anhydrides, 4-(4-cyanobenzoyl)thiophenol, 4(2-hydroxyethoxy)phenyl 2-hydroxy-2-propyl ketone, 4-(2-aminoethoxy)phenyl 2-hydroxy-2-propyl ketone, 4-(2-hydroxycarbonylmethoxy)phenyl 2-hydroxy-2-propyl ketone, 4-(2-isocyanatoethoxy)phenyl 2-hydroxy-2-propyl ketone, 4(2-isocyanatomethoxy)phenyl 2-hydroxy-2-propyl ketone, 2-([2-]6-isocyanatohexylaminocarbonyloxy)ethoxylthioxanthone, phenylglyoxylic acid, esters of phenylglyoxylic acid with polyols, the polyols which can be used being essentially the polyols described under b1.2) and b1.3) and used for the polyurethane synthesis, amides of phenylglyoxylic acid with amino alcohols, the alcohols which can be employed as amino alcohols being monoamino polyols having two aliphatically bonded hydroxyl groups, as described in the present application under component d) in the context of the polyurethane synthesis. Examples of monoamino polyols having more than two aliphatically bonded hydroxyl groups which are likewise suitable for preparing the amides of phenylglyoxylic acid are tris(hydroxy-methyl)methylamine, 2-[tris(hydroxymethyl)methylamino]ethanesulfonic acid, 3-[tris(hydroxymethyl)methylamino]propanesulfonic acid, N-[tris(hydroxymethyl)methyl]glycine, tris(3-hydroxypropyl)methylamine, glucamine and N-(2-hydroxyethyl)glucamine or the amino diols, such as N,N'-bis(2-hydroxyethyl)ethylenediamine, and reaction products of a primary polyether diamine and, per mole of polyether diamine, 2 mol of ethylene oxide, propylene oxide and/or butylene oxide, the conditions for the reaction of the polyether diamine with the alkylene oxide being selected such that there is selective formation of the N,N'-bis(hydroxyalkylamine) derivative having two secondary amino groups. Examples of the polyether diamines are 4,7-dioxadecane-1,10-diamine, 4,11-dioxatetradecane-1,14-diamine, α-(2-aminomethylethyl)-ω-(2-aminomethylethoxy)poly[oxy(methyl-1,2-ethanediyl)] with a molecular weight of from about 200 to about 3000, and α-(3-aminopropyl)-ω-(3-aminopropoxy)poly[oxy(1,4-butanediyl)] with a molecular weight of from about 300 to about 3000.

Likewise suitable for reaction with phenylglyoxylic acid to form the corresponding amides are monoamino polyols having only one aliphatically bonded hydroxyl group, as described for component d).

There are various options for incorporating structural units of component c) having the formula I into the novel polyurethane. If the compounds of component c) carry amino, thiol or aromatically bonded carboxyl as functional group(s) then it is possible, for example, to carry out addition onto isocyanate groups. This means that component c) either is subjected to an addition reaction with a prepolymer having free, terminal isocyanate groups or is present in the reaction mixture as a reactive component during the polyaddition reaction for preparing the polyurethane. Subsequent addition reaction with a prepolymer having free isocyanate groups can take place before, during or after the addition of water to the isocyanato-containing prepolymer, to form urea, thiourethane or amide linkages.

The same preconditions apply if one or more hydroxyl groups are present on the photoinitiator as functional group(s). In this case, an addition reaction with existing free isocyanate groups is likewise carried out.

If the functional groups are isocyanate groups, then the compounds of component c) can be reacted in the prepolymer synthesis together with component a) with the other components b1), b2), d), e) or f) which are required or desired for synthesizing the novel polyurethane, in which case urethane groups are formed as a result, for example, of reaction with hydroxyl groups from a polyol component.

The addition reaction of the compounds of component c) which contain isocyanate groups can also be carried out subsequently, before, during or after the addition of water to the isocyanato-containing prepolymer. By virtue of the further reaction of the isocyanate groups with water or with an added diamine or polyamine, the compounds of component c) are incorporated into the polyurethane in a known manner by way of formation of urea groups.

If the compounds of component c) contain aromatically bonded hydroxyl groups as functional groups, then alkylene oxides, such as ethylene oxide, propylene oxide or butylene oxide, are preferably added onto the hydroxyl group prior to the reaction with isocyanate groups. This addition reaction should in particular be allowed to proceed to completion such that after the reaction there are no aromatically bonded hydroxyl groups but only aliphatically bonded hydroxyl groups left.

Prior to incorporation into the polyurethane and provided they have hydroxyl groups, the compounds of component c) can be reacted with polycarboxylic acids, phosgene, phosgene analogs or caprolactones to form polyester-, polycarbonate- or polycaprolactonepolyols by known methods and can be incorporated as such, by reaction with free polyisocyanates, into the polyurethane.

Compounds of component c) which carry carboxyl groups as functional groups can be used to prepare hydroxyl-containing polyesters by known methods. This is generally accomplished by reaction with polyols as have already been mentioned in the context of the description of components b1) and b2).

If the compounds of component c) carry as functional groups a 2-oxa-1,3-bis(oxo)-1,3-propanediyl radical, then the structural units of the formula I are preferably reacted with polyols in a ring-opening monoesterification to form carboxyl-containing polyols.

In overall terms, the hydroxyl-containing compounds of component c) can be converted by a number of reactions known to the skilled worker, for example esterification with carboxylic acids, reaction with phosgene or with caprolactones, to form polyols having the desired photoinitiator activity of component c). The polyols prepared in this way can readily be reacted further to form the novel polyurethanes by employing them, for example, in a mixture with component b1) or with component b2) or even in place of one of these components.

The photoinitiator-containing polyols described here can also be used in a mixture with one another to prepare the novel polyurethanes. These polyols have an average molecular weight of from about 240 to about 5000, preferably from about 300 to about 2500 and, with particular preference, from about 1000 to about 2000 g/mol. The average functionality is from about 1 to about 5, preferably from about 1.5 to about 3 and, with particular preference, from about 1.8 to about 2.2.

The conditions for the reaction of the compounds of component c), if they carry amino, mercapto and/or carboxyl and hydroxyl groups, with free polyisocyanates or with prepolymers carrying free isocyanates should be chosen such that the fully reacted polyurethane contains no more than 10% of the amount employed of amino groups, mercapto groups or hydroxyl and/or carboxyl groups originating from this reaction.

If the compounds of component c) are reacted with an isocyanato-containing polyurethane prepolymer it is also possible to use compounds of higher functionality having three or four functional groups, especially amino and/or mercapto groups, if the reaction takes place during or after the dispersion of the polyurethane prepolymer.

The concentration of compounds of component c), based on solid resin, is from 20 to 2000, preferably from 50 to 1000 and, with particular preference, from 100 to 500 mmol/kg.

If compounds of component c) carry at least one isocyanate-reactive group and also at least one carboxyl or sulfo group which does not serve for incorporation into the polyurethane, or if polyols prepared using a corresponding compound of component c), as described above, are used to prepare the novel polyurethanes, then the resulting polyurethanes carry free carboxyl or sulfo groups. It is therefore possible to introduce ionizable groups into the novel polyurethane without the use of components e).

As component d) it is possible, for example, to employ chain extenders or compounds having a functionality of more than two which are suitable for introducing branching and which can also have at least one primary or secondary amino group or else, insofar as there is more than one amino group per molecule, primary and secondary amino groups at the same time.

In addition to the amino groups the compounds of component d) can also have further functional groups, especially isocyanate-reactive groups. These include, in particular, hydroxyl groups or mercapto groups.

Examples of the compounds which can be employed for the purposes of the invention as component d) include monoamino polyols having an aliphatically bonded hydroxyl group, such as ethanolamine, N-methylethanolamine, N-ethylethanolamine, N-butylethanolamine, N-cyclohexylethanolamine, N-tert-butylethanolamine, leucinol, isoleucinol, valinol, prolinol, hydroxyethylaniline, 2-(hydroxymethyl)piperidine, 3-(hydroxymethyl)piperidine, 2-(2-hydroxymethyl)piperidine, 2-amino-2-phenylethanol, norephedrine, 2-amino-1-phenylethanol, ephedrine, p-hydroxyephedrine, adrenaline, noradrenaline, serine, isoserine, phenylserine, 1,2-diphenyl-2-aminoethanol, 3-amino-1-propanol, 2-amino-1-propanol, 2-amino-2-methyl-1-propanol, isopropanolamine, N-ethylisopropanolamine, 2-amino-3-phenylpropanol, 4-amino-1-butanol, 2-amino-1-butanol, 2-aminoisobutanol, neopentanolamine, 2-amino-1-pentanol, 5-amino-1-pentanol, 2-ethyl-2-butyl-5-aminopentanol, 6-amino-1-hexanol, 2-amino-1-hexanol, 2-(2-aminoethoxy) ethanol, 3-(aminomethyl)-3,5,5-trimethyl-cyclohexanol, 2-aminobenzyl alcohol, 3-aminobenzyl alcohol, 3-amino-5-methylbenzyl alcohol and 2-amino-3-methylbenzyl alcohol.

If the use of component d) is intended, for instance, to produce chain branches, then it is possible, for example, to employ monoamino polyols having two aliphatically bonded hydroxyl groups, such as 1-amino-2,3-propanediol, 2-amino-1,3-propanediol, 2-amino-2-methyl-1,3-propanediol, 2-amino-2-ethyl-1,3-propanediol, 2-amino-1-phenyl-1,3-propanediol, diethanolamine, diisopropanolamine, 3-(2-hydroxyethylamino)propanol and N-(3-hydroxypropyl)-3-hydroxy-2,2-dimethyl-1-aminopropane.

Likewise possible is the use of polyamines as component d). These include compounds such as, for example, hydrazine, ethylene diamine, 1,2- and 1,3-propylenediamine, butylenediamines, pentamethylenediamines, hexamethylenediamines, for example 1,6-hexamethylenediamine, alkylhexamethylenediamines, for example 2,4-dimethylhexamethylenediamine, generally alkylenediamines having up to about 44 C atoms, where cyclic or polycyclic alkylenediamines can also be employed as can be obtained, for example, in a known manner from the dimerization products of unsaturated fatty acids. It is likewise possible to employ aromatic diamines, for example 1,2-phenylenediamine, 1,3-phenylenediamine or 1,4-phenyldiamine. Examples of higher amines which can be employed for the purposes of the invention are diethylenetriamine, triethylenetetramine and aminomethyl-1,8-diaminooctane.

In order to render the polyurethanes dispersible in water they generally have incorporated into them hydrophilicizing, nonionic, anionic or cationic structural units or structural units which can be converted into anionic or cationic groups.

By structural units which can be converted into anionic or cationic groups there are meant, for the purposes of the present invention, those structural units which can be converted to an ionic form by a simple chemical reaction, for example addition of base, addition of acid or quaternization with, for example, alkyl halides. Examples of such units are acid groups, tertiary amines or amides.

In addition to the components a), b1), b2), c) and, if used, d), further hydrophilic components e) are incorporated during the preparation of the novel polyurethanes insofar as dispersibility in water has not already been provided by the incorporation of suitable polyether chains as part of the incorporation of components b1) and/or b2). Suitable components e) are compounds having at least one isocyanate-reactive group and at least one group which can be ionized by addition of base, addition of acid or quaternization or has already been ionized by such a reaction. In the text below the terms anionic groups and cationic groups are used synonymously both for groups which have been ionized by addition of acid or base or by quaternization and for the free acids or free bases, unless specified otherwise.

The proportion of component e) with anionic or cationic groups in the totality of components a), b1), b2), c) and, if used, d) is generally such that the molar amount of the anionic or cationic groups, based on the amount by weight of all of the components employed, is from about 30 to 1000, preferably from about 50 to 600 and, with particular preference, from about 80 to 500 mmol/kg. In any case, however, the proportion of component e) is high enough for the resulting polyurethane to be at least substantially self-dispersible in water.

Those compounds incorporated into the polyurethane as component e) are in particular those which carry anionic groups such as the sulfonate, the carboxylate or the phosphonate group or mixtures of two or more thereof. This is effected either in the form of the free acids or, preferably, in the form of their alkali metal salts or ammonium salts, possible counterions being cations, such as ammonium ions, especially protonated tertiary amino groups or quaternary ammonium groups.

Potential ionic hydrophilic groups are, in particular, those which can be converted into the abovementioned ionic hydrophilic groups by means of simple neutralization, hydrolysis or quaternization reactions, i.e. for example carboxyl, anhydride or amino groups, the latter preferably being tertiary amino groups.

Suitable monomers having anionic groups are usually aliphatic, cycloaliphatic, araliphatic or aromatic carboxylic or sulfonic acids which carry at least one alcoholic hydroxyl or at least one primary or secondary amino group. Preference is given to the hydroxyalkylcarboxylic acids, especially those of 3 to 10 carbons, described in U.S. Pat. No. 3,412,054. Particular preference is given to dimethylolpropionic acid (DMPA).

Other compounds suitable as component e) are corresponding dihydroxysulfonic acids and dihydroxyphosphonic acids or basic phosphines, such as diethyl-β-hydroxyethylphospline, methyl-bis-β-hydroxyethylphosphine and tris-β-hydroxymethylphosphine and also bis(α-hydroxyisopropyl)phosphinic acid, hydroxyalkanephosphinic acid and bis-glycol phosphate.

Compounds otherwise suitable are hydroxyl compounds having a molecular weight of more than 500 to 10,000 g/mol and at least two carboxylate groups, as are known, for example, from DE-A 3 911 827. They are obtainable by reacting dihydroxy compounds with tetracarboxylic dianhydrides, such as pyromellitic dianhydride or cyclopentanetetracarboxylic dianhydride, in a polyaddition reaction in a molar ratio of from 2:1 to 1.05:1. Particularly suitable polyhydroxy compounds are the low molecular mass diols and polyols listed under b1.2) and b1.3).

Compounds having tertiary amino groups are of particular practical importance as component e) carrying cationic groups, examples being tris(hydroxyalkyl)amines, N,N'-bis (alkyl)alkylamines, N-hydroxyalkyldialkylamines, tris (aminoalkyl)amines, N,N'-bis(aminoalkyl)alkylamines, N-aminoalkyldialkylamines, the alkyl and the alkanediyl of these tertiary amines consisting independently of one another of from one to six carbons. Also suitable are polyethers having tertiary nitrogens and preferably two terminal hydroxyls, as obtainable, for example, by conventional alkoxylation of amines having two hydrogens attached to amine nitrogen, for example methylamine, aniline or N,N'-dimethylhydrazine. Polyethers of this kind generally have a molar weight of from 500 to 6000 g/mol.

These tertiary amines are converted into the corresponding ammonium salts either with acids, preferably strong mineral acids such as phosphoric acid, sulfuric acid or hydrohalic acids, or with strong organic acids, for example formic acid or acetic acid, or by reaction with suitable quaternizing agents, such as $C_{1-6}$-alkyl halides, for example alkyl bromides or alkyl chlorides, or benzyl halides.

The compounds employed as component e) can be converted into their ionic form before, during or—preferably—after the isocyanate polyaddition reaction, since the ionic monomers are frequently of poor solubility in the reaction mixture.

As component f) for preparing the novel polyurethane it is possible if desired to employ compounds having at least one isocyanate-reactive group and at least one olefinically unsaturated double bond. The olefinically unsaturated double bond preferably lends itself readily to free-radical polymerization, and with particular preference is a double bond activated by aromatic groups or by carbonyl groups as is present, for example, in styrene or in acrylic acid, methacrylic acid or esters thereof.

In the text below, when referring to acrylic acid or methacrylic acid or derivatives thereof, the form (meth) acrylic acid is used, as for example in poly(meth)acrylic acid.

Where compounds having only one isocyanate-reactive group are employed as component f) the olefinically unsaturated double bonds are incorporated at the end of the polyurethane chain. Where compounds having two or more isocyanate-reactive groups and at least one olefinically unsaturated double bond are used as component f) incorporation generally takes place, given an appropriate reaction regime, in the polyurethane chain, although incorporation at the chain end is possible in this case too. Incorporation in the polyurethane chain refers for the purposes of the invention both to incorporation of the double bond as part of the polymer backbone and to introduction of the double bond in the form of a side chain. Examples of suitable monomers containing hydroxyl groups and at least one olefinically unsaturated double bond are hydroxyalkyl (meth)acrylates, such as 2-hydroxyethyl (meth)acrylate, hydroxypropyl (meth)acrylates and 4-hydroxybutyl (meth)acrylate. Polypropylene glycol mono(meth)acrylates and polyethylene glycol mono(meth)acrylates are also suitable. Compounds suitable for introducing two or more olefinically unsaturated double bonds are the poly(meth)acrylates of polyhydric alcohols, such as glycerol di(meth)acrylate, trimethylolpropane di(meth)acrylate, and pentaerythritol di- or tri(meth)acrylate.

Using appropriate polyol components having at least two hydroxyl groups, the olefinically unsaturated double bonds can be incorporated not only at the end of the polyurethane chain but also as a side chain on the polymer backbone. Compounds suitable for this purpose are, for example, glycerol mono(meth)acrylate, trimethylolpropane mono (meth)acrylate and pentaerythritol mono- or -di(meth) acrylate. Likewise suitable for use for this purpose are the ring opening products of (meth)acrylic acid with bisepoxides, for example the glycidyl ethers of bisphenol A, ethylene glycol, 1,4-butanediol or 1,6-hexanediol.

If desired it is also possible as component f) to employ oligomeric or polymeric compounds which carry at least one isocyanate-reactive group and at least one olefinically unsaturated double bond. Examples of these include polyesters which have been prepared with the aid of olefinically unsaturated diols or polyols or, preferably, with the aid of olefinically unsaturated dicarboxylic acids or polycarboxylic acids. Preference is given to the use of those polyesters which can be prepared using the components described for b1.1) and b1.2) with the at least partial use of unsaturated dicarboxylic acids, for example maleic acid, maleic anhydride or fumaric acid.

The acid groups present in the novel polyurethane are neutralized prior to or, preferably, after incorporation into the polyurethane chain, using a basic neutralizing agent. Suitable basic neutralizing agents are, in general, for example alkali metals, such as Li, Na or K, and the alkaline earth metals, such as Ca, Mg, Ba or Sr, although the latter are not preferred in the context of the present invention. More suitable, and preferred in the context of the present invention, are all salts of the abovementioned metals that are capable of reacting to neutralize the acid groups, especially the carbonates or the hydroxides, for example LiOH, NaOH, KOH or $Ca(OH)_2$. Of the latter, NaOH is particularly preferred.

Also suitable for neutralization and particularly preferred in the context of the present invention are organic, nitrogen-containing bases, for example ammonia, and amines, such as trimethylamine, triethylamine, tributylamine, dimethylaniline, dimethylethanolamine, methyldiethanolamine or triethanolamine, and mixtures thereof. Neutralization with the nitrogen-containing organic bases can be carried out in the organic or in the aqueous phase. Compounds of component e) neutralized with nitrogen-containing bases, as described below, are therefore generally also suitable in neutralized form for incorporation into the polyurethane in organic solution.

If neutralization of the acid groups is desired, the neutralizing agent can be added in an amount such that a sufficient proportion of the acid groups, generally from about 0.1 to 100%, is neutralized.

In general at least 10%, preferably 25% and, with particular preference, at least 50% of the ionizable groups present in the novel polyurethane that can be converted to anionic or cationic groups by addition of acid or base or by quaternization are neutralized. However, it is also possible for at least 75% or, for example, even substantially all—i.e. about 100%—of the ionizable groups, present in the novel polyurethane, to be neutralized.

The novel polyurethane should preferably be non-crystalline and non-semicrystalline and should have a number-average molecular weight ($M_n$) of at least 2700 and/or a weight-average molecular weight ($M_w$) of about 5000 g/mol. The required lower limit of the molecular weight is dependent on the desired morphology of the coating which is obtainable by physical drying. In general, the lower limit should be chosen such that optically flawless surfaces which are tack-free, dust-dry or solid even before UV irradiation are formed from the novel coating composition. Depending on the structure of the polyurethane this can be ensured even at molecular weights upward of about 2700 ($M_n$), although higher lower limits may also be desirable for the molecular weight $M_n$, for example 3000, 4000, 5000 or even 8000 to 10,000 daltons. The upper limit is determined largely by the upper limit which can be achieved by the particular synthesis process employed. Further limiting factors are, for example, the solution viscosity of the polyurethane and the processing properties and crosslinking properties of the resulting coating composition. In general an upper limit of about 100,000 daltons for $M_n$ is sufficient, although the molecular weight can also be lower, for example 50,000 or 30,000 daltons.

In this context the molecular weight can be determined by methods familar to the skilled worker, for example membrane osmometry, vapor pressure osmometry, gel permeation chromatography, time-of-flight mass spectrometry, viscometry or light scattering.

The invention additionally relates to a process for preparing the novel polyurethane, as described above, in which polyisocyanates of component a) are reacted at least with one or more polyols of component b) and with at least one compound of component c) and also, if desired, with one of components d), e) or f) or with a mixture of two or more thereof.

The invention additionally provides an aqueous polyurethane dispersion which comprises at least one of the above-described polyurethanes which are essentially self-dispersible in water and are prepared from components a), b) and c) and, if desired, d), e) or f) or from a mixture of two or more thereof. If the polyurethanes have been prepared using component f) they contain at least one olefinically unsaturated double bond in the polymer chain. Polyurethane dispersions of this kind are crosslinkable by irradiation with UV light after drying, i.e. after at least substantial removal of water and of any organic solvents present.

If the novel polyurethanes have been prepared without compounds of component f) then the novel polyurethane dispersions are blended with a further component comprising compounds having free-radically polymerizable, olefinically unsaturated double bonds. Such blending can also be undertaken, however, even if the novel polyurethane employed contains olefinically unsaturated double bonds.

Appropriate olefinically unsaturated double bonds are, in particular, olefinic double bonds from α,β-unsaturated ester compounds, for example the esters of acrylic acid or of methacrylic acid. These compounds containing unsaturated ester groups can be mixed, in solid, liquid or solution form (in organic solvents) or as a dispersion or emulsion of a compound containing chemically bonded, unsaturated ester groups, with the novel polyurethane prior to or after dispersion in water.

The compound containing unsaturated ester groups is preferably a polymer or a mixture of two or more polymers, it being possible for the polymer or polymers to be polyadducts, polycondensates or polymers prepared by a free-radical method. The chemical attachment of the unsaturated groups can be accomplished by copolymerizing a monomer having one or more unsaturated ester groups or, especially in the case of a polymer prepared by free-radical polymerization, by means of a subsequent, polymer-analogous reaction. This polymer-analogous reaction can take place either in organic solution before addition to the novel dispersion or in the novel dispersion itself.

It is preferred to employ polymers containing olefinically unsaturated double bonds. These include, for example, polyesters as obtainable by reaction of polyols, as have been described, for example, under b1.2) and b1.3), with dibasic to tetrabasic carboxylic acids, described for example under b1.1), and, for example, (meth)acrylic acid.

The polymers which contain olefinically unsaturated double bonds and which are introduced into the dispersion if desired in addition to the novel polyurethane generally have a molecular weight of at least about 300, preferably at least about 400. These polymers preferably have no urethane groups.

The content of unsaturated ester groups, based on the dry mass of the dispersion, preferably based on the dry mass of the polymeric binders, is from about 50 to about 2500, preferably from about 100 to about 2000 and, with particular preference, from about 150 to about 1500 mmol/kg.

The term polymeric binders which is used to define the concentration of compounds of component c) and of olefinically unsaturated double bonds relates exclusively to the novel polyurethane in the case where the novel polyurethane contains such olefinically unsaturated double bonds and there is no longer any other polymer containing olefinically unsaturated double bonds present in the novel dispersion. In the case where the novel polyurethane does not have olefinically unsaturated double bonds and where there is a further, polymeric binder component which has olefinically unsaturated double bonds present in the novel dispersion alongside the novel polyurethane, the term solid resin refers to the overall amount of polymeric binder, comprising novel polyurethane and further polymeric binders containing olefinically unsaturated double bonds. The same applies if further polymeric binders containing olefinically unsaturated double bonds are employed in addition to the novel polyurethane containing olefinically unsaturated double bonds.

The proportion of water in the novel dispersions or emulsions is from about 20 to about 80% by weight, preferably from about 25 to about 75% by weight and, with particular preference, from about 30 to about 65% by weight.

The proportion of polyurethane, based on the overall solid resin, is at least about 20% by weight, preferably at least about 40% by weight and, with particular preference, at least about 60% by weight.

The invention additionally relates to a process for preparing an aqueous polyurethane dispersion, in which at least one novel polyurethane, alone or together with further polymeric binders and further customary coatings additives, is dissolved or dispersed in water.

The invention also provides a coating composition obtainable by dissolving or dispersing in water at least one novel polyurethane, alone or together with further polymeric binders and further customary coatings additives.

The invention likewise provides a process for preparing a coating composition, in which at least one novel polyurethane, alone or together with further polymeric binders and further customary coatings additives, is dissolved or dispersed in water.

The coating composition prepared in accordance with the invention also contains further customary coatings additives. These include, in particular, thickeners, pigments, organic solvents in proportions of not more than 20%, dyes, emulsifiers, surfactants, heat stabilizers, leveling assistants, wetting agents, fillers, sedimentation inhibitors, flame retardants or antioxidants or mixtures of two ore more thereof, which can be added simultaneously or in succession at any desired point in time during the preparation of the coating composition.

The novel coating compositions can be applied to a large number of substrates, for example to wood, metal, glass, fabric, leather, concrete, paper, plastic, plastic foam and the like.

The present invention therefore likewise provides a process for coating articles with the novel polyurethane dispersions or coating compositions, in which the novel polyurethane dispersions or coating compositions are applied to the article by means of a technique customary in coatings technology, such as rolling, spreading, knife coating, spraying, dipping or another technique, are first of all dried and then are crosslinked by irradiation with UV rays.

The invention also provides articles coated, preferably by the above process, with one of the novel polyurethane dispersions or coating compositions.

EXAMPLES

Abbreviations

| | |
|---|---|
| DETA | Diethylenetriamine |
| DMEA | Dimethylethanolamine |

| | |
|---|---|
| DMPA | Dimethylolpropionic acid |
| IPDI | Isophorone diisocyanate |
| MEK | Methyl ethyl ketone |
| MW | Molar weight |
| TMP | Trimethylolpropane |
| p | parts |

The following photoinitiators were incorporated in accordance with the invention into the polyurethanes described:

A. Photoinitiator I: IRGACURE 500 (from CIBA-GEIGY)=1:1 mixture of benzophenone and 1-hydroxycyclohexyl phenyl ketone B. Incorporable photoinitiator II: Benzophenonetetracarboxylic dianhydride C. Incorporable photoinitiator III: IRGACURE 2959 (from CIBA-GEIGY)

D. Incorporable photoinitiator IV: Phenylglyoxylic acid

E. Incorporable photoinitiator V:

F. Incorporable photoinitiator VI:

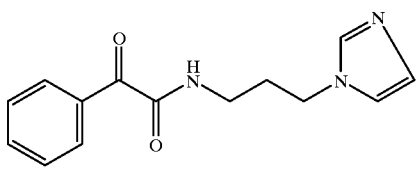

Preparation Instructions for Photoinitiator V

A mixture of 161.2 p (1 mol) of N-(3-hydroxy-3,2-dimethylpropyl)-N-(3-hydroxypropyl)amine and 180 g (1.1 mol) of methyl phenylglyoxylate was reacted at 80° C. for 4 hours under a reduced pressure of 30 mbar. During this time, 33.4 p (1.045 mol) of methanol were eliminated. The product was a viscous, pale brownish mass. $^1$H-NMR confirmed the desired structure in the product mixture to the extent of at least 90%. The hydroxyl number was 350 mg of KOH/g (theory 365).

Preparation Instructions for Photoinitiator VI 75.1 p (0.46 mol) of methyl phenylglyoxylate and 300 p of ethanol were introduced into a vessel. 57 p (0.45 mol) of N-3-aminopropylimidazole were added. After stirring at room temperature for 2 hours, the solvent was removed. The product was a viscous, almost colorless mass. $^1$H-NMR analysis indicated a purity of at least 95%.

Dispersion 1

400 p (0.4 mol) of polyesterdiol (based on adipic acid, isophthalic acid and 1,6-hexanediol and having a MW of 1000) were reacted with 51.6 p of photoinitiator II (0.16 mol) at 125° C. until the mixture became clear. 148.7 p of 1,4-butanediol (1.65 mol) and 300 g of MEK were added. After cooling to 70° C., 453.5 p of IPDI (2.04 mol) were added. After a further 3.5 hours the mixture was diluted with 600 p of acetone, the isocyanate content being 0.9% by weight (theory 0.64%). The reactor was protected against light, and 362.3 p of acrylate resin LAROMER®LR 8945 were added. For neutralization, 22.82 p (0.256 mol) of dimethylethanolanine were added (theoretical degree of neutralization 80%). Following the addition of 2000 p of water and 10.3 p (0.1 mol) of DETA, the acetone was removed by distillation. Solids content: 43.7%, pH 7.2.

Dispersion 2

400 p (0.4 mol) of polyester (as in Example 1), 169.8 p (0.8 mol) of photoinitiator III, 40.2 p (0.3 mol) of DMPA, 36 p of 1,4butanediol (0.4 mol) and 250 p of MEK were introduced into a vessel. Following the addition of 452.4 p (2.04 mol) of IPDI, the mixture was reacted at 80° C. After one hour 33.6 p (0.25 mol) of TMP were added. After 3 hours the mixture was diluted with 500 g of acetone, the isocyanate content being 0.69% by weight (theory 0.71%). After neutralization with 24 p of 50% strength NaOH, addition of 1950 g of water and crosslinking with 8.8 g (0.09 mol) of DETA an opaque dispersion was formed. Solids content: 35.8%, pH 9.7.

Dispersion 3

Dispersion 3 was prepared in a manner similar to that used for dispersion 2 with the difference that only 84.9 p (0.4 mol) of photoinitiator III but an additional 46.4 p (0.4 mol) of hydroxyethyl acrylate were used. The reactor was protected against light. An opaque dispersion was formed. Solids content: 37.7%, pH 8.5.

Dispersion 4

200 p (0.1 mol) of polyesterdiol (based on adipic acid, isophthalic acid and 1,6-hexanediol, MW 2000), 44.94 p (0.34 mol) of DMPA, 48.1 p (0.78 mol) of ethylene glycol, 275 p of MEK and 21.22 p (0.1 mol) of photoinitiator III and 241.2 p (1.38 mol) of an isomer mixture of 80% 2,4- and 20% 2,6-tolylene diisocyanate were reacted at 90° C. After one hour 6.71 p (0.05 mol) of TMP and, after a further 3 hours, 99 p of LAROMER®LR 8945 were added. After an additional 2 hours, at 90° C., 275 p of acetone, 26.8 p of 50% strength NaOH and 1100 p of water were added in succession. The acetone was removed by distillation. A pale brownish and translucent dispersion was formed. Solids content 36.6%, pH 8.0.

Dispersion 5

Dispersion 5 was prepared by a method similar to that used for dispersion 2 with the difference that the photoinitiator III was replaced by 120.1 p (0.8 mol) of photoinitiator IV, photoinitiator IV and IPDI having been reacted with one another at 90° C. for 2.5 hours beforehand without any other components. Following dilution with acetone the isocyanate content was 0.46%. A pale yellowish, opaque dispersion was formed. Solids content 34% by weight, pH 7.6.

Dispersion 6

200 p (0.1 mol) of polyesterdiol as in dispersion 4 (based on adipic acid, isophthalic acid and 1,6-hexanediol, MW 2000), 45 p (0.36 mol) of DMPA, 46.1 p (0.74 mol) of ethylene glycol, 275 p of MEK and 30.5 p (0.1 mol) of photoinitiator V were reacted with 231.9 p (1.33 mol) of an isomer mixture comprising 80% 2,4- and 20% 2,6-tolylene diisocyanate at 90° C. for 4 hours. Then 99 p of LAROMER®LR 8945 were added and the mixture was reacted, with protection from light, at 90° C. for 2 hours. Subsequently 275 p of acetone, 26.8 p of 50% strength NaOH and 1100 p of water were added in succession. The acetone was removed by distillation. A brownish translucent dispersion was formed. Solids content 38.6%.

Dispersion 7

200 p of polyesterdiol as in dispersion 4 (0.1 mol), 20.1 p of DMPA (0.15 mol), 26.1 p of 1,4-butanediol (0.29 mol), 22.0 p of photoinitiator V (0.075 mol) and 200 p of MEK were introduced into a vessel. 82.7 p of TDI (0.475 mol) were added, and the mixture was reacted at 80° C. for 2 hours. Then 45.0 p (0.203 mol) of IPDI were added and the mixture was reacted at 80° C. for 2 hours. Then 12.9 p (0.05 mol) of photoinitiator VI were added and the mixture was reacted at 75° C. for 6 hours.

It was then diluted with 300 p of acetone, neutralized with 8.0 p (0.09 mol) of DMEA and dispersed with 1000 p of deionized water. The acetone was distilled off. Solids content: 29.4%, pH 7.4.

Dispersion 8

Dispersion 8 was prepared as for dispersion 7 with the difference that photoinitiator VI was not added. Solids content: 32.6%, pH 6.5.

Dispersion 9

200 p of polyesterdiol (based on adipic acid, ethylene glycol; MW=2000) (0.1 mol), 32.2 p (0.24 mol) of DMPA, 29.3 p (0.325 mol) of 1,4-butanediol and 90 p of MEK were introduced into a vessel. 180.1 p (0.18 mol) of IPDI were added and the mixture was reacted at 90° C. for about 2.5 hours. Following the addition of 6.7 p (0.05 mol) of TMP the mixture was left to react at 90° C. for one hour more. Then 36.0 p (0.14 mol) of photoinitiator VI were added, and the mixture was reacted for 3 hours more. Then 350 p of acetone and 17.1 p (0.192 mol) of DMEA and 1100 p of deionized water were added. The acetone was distilled off. Solids content: 29.0%, pH 7.5.

Comparison Dispersion 1

Comparison dispersion 1 was prepared as for dispersion 2 with the difference that photoinitiator III was replaced by 92.9 p (0.8 mol) of hydroxyethyl acrylate. An opaque dispersion was formed. Solids content: 38.2%, pH 8.5.

Comparison Dispersion 2

LAROMER® 8949, a commercially available polyurethane dispersion with incorporated acrylic ester groups from BASF AG.

Film Preparation

A film of the above dispersions was applied to a glass plate using a 200 μm doctor blade. The film was dried at room temperature for about 5 to 10 minutes. The film was subsequently treated at 60° C. in a drying oven for 20 minutes.

Pendulum Hardness

The pendulum hardness was determined in accordance with DIN 53 157 using a König instrument. The time in seconds was determined.

Chemical Resistance

The chemical resistance test was carried out in accordance with DIN 68 861. However, only 10 test media were selected from the entire range, and exposure group 1b was configured accordingly. The individual test media are sodium carbonate, red wine, instant coffee, blackcurrant juice, ethylbutyl acetate, mustard, lipstick, disinfectant, ballpoint pen paste and cleaning fluid.

Spray Application

Application was carried out with a flow cup gun with nozzles of 1.3 to 1.6 mm. The pressure of the gun inlet was from about 2 to 2.5 bar. In the case of application to wood, two coats of about 100 p/m² were applied in each case. Between the first and the second coat, the film was dried at 60° C. for 15 minutes and then exposed to UV at a rate of 5 m/min. Before applying the second coat, sanding was carried out (coarseness about 240). The second layer was dried and exposed as for the first.

Test results

| | Ex. | | | | | |
|---|---|---|---|---|---|---|
| | 1 | 2 | 3 | 4 | 5 | 6 |
| Coating test method | Disp. 1 | 100 p Disp. 2 + 100 p comp. disp. 2 | Disp. 3 | 50 p Disp. 5 + 100 p comp. disp. 2 | 100 p comp. disp. 2 + 3 p Photoinit. I | 100 p comp. disp. 1 + 3 p Photoinit. I |
| Pendulum hardness before UV | 40 | 76 | 55 | 46 | 7 | 39 |
| Pendulum hardness after UV | 70 | 86 | 108 | 75 | 147 | 106 |
| Chemical resistance before UV[1] | 3 | 2.55 | 2.85 | 2.65 | 3.3 | 2.75 |
| Chemical resistance after UV[1] | 1.3 | 0.85 | 1.05 | 0.95 | 0.8 | 1.15 |
| Odor | − | − | − | − | + | + |

[1]0 = best value

All dispersions with covalently incorporated photoinitiator showed a marked improvement in film resistance after UV irradiation coupled with outstanding physical drying.

In the case of Examples 5 and 6, a slight odor of benzaldehyde was noted following irradiation.

Comparison of Example 2 with Example 4 shows that the covalently incorporated photoinitiator is just as effective as a corresponding added photoinitiator. An identical result is shown by comparing Example 3 with Example 5 as well.

We claim:

1. A polyurethane which is substantially self-dispersible in water and has a number-average molecular weight $M_n$ of more than 2700, which is obtained by reacting a) at least one polyisocyanate with b) at least one polyol consisting of b1) from 9 to 100 mol-% of a polyol or a mixture of two or more polyols having a molecular weight of at least 500 and b2) from 0 to 91 mol-% of a polyol or a mixture of two or more polyols having a molecular weight of less than 500, b1) and b2) together making up 100 mol-% of component b), and c) at least one photoinitiator of the formula I

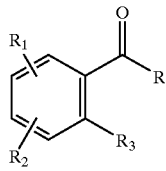

(I)

where R is a radical of the formula II

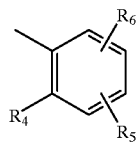

(II)

or is —CR$^7$R$^8$R$^9$, P(=O)(R$^{10}$)$_2$ or SO$_2$R$^{11}$ and at least one of the radicals R$^1$, R$^2$, R$^5$, R$^6$, and R$^9$ is used for incorporation into the polyurethane and the remaining radicals, one or more of the R$^1$, R$^2$, R$^5$, R$^6$, and R$^9$, each independently are hydrogen, C$_{1-12}$-alkyl, C$_{1-12}$-alkoxy, halogen, cyano, nitro or sulfo, R$^3$ and R$^4$ each independently are hydrogen or COOH or together are S, R$^7$ and R$^8$ each independently are hydrogen, C$_{1-12}$-alkyl, C$_{1-12}$-alkenyl, C$_{1-12}$-alkoxy or phenyl or together are =O or C$_{2-6}$-alkylene, R$^9$ is OR$^{11}$, N(R$^{11}$)$_2$, N-piperidyl, N-piperazyl or N-morpholino, R$^{10}$ is C$_{1-12}$-alkyl, C$_{1-12}$-alkanoyl, phenyl or benzoyl, each of which can in turn be substituted by halogen, C$_{1-12}$-alkyl or C$_{1-12}$-alkoxy, R$^{11}$, independently at each occurrence, is hydrogen is unsubstituted or OH—, NHR$^{10}$—, NH$_2$— or SH-substituted C$_{1-6}$-alkyl, C$_{1-12}$-alkoxy or phenyl, or together are C$_{2-5}$-alkylene, and, if R$^9$ is OR$^{11}$ and R$^{11}$ is hydrogen, R$^7$ and R$^8$ in combination cannot be hydrogen and phenyl;

wherein said polyol b1) is selected from the group consisting of a polyester polyol, a polycarbonate diol, a lactone polyester diol and a polyether diol; wherein said polyester polyol is formed by reacting an alcohol with a polycarboxylic acid; and wherein said polycarboxylic acid is represented by the formula: HOOC—(CH$_2$)Y—COOH; and wherein said polyol b2) is selected from the group consisting of an alcohol of formula HO—(CH$_2$)13 OH, where x is 1 to 20, neopentyl glycol, a bis(hydroxymethyl)cyclohexane, 2-methyl-1,3-propanediol, methylpentanediol, diethyl glycol, triethyl glycol, tetraethyl glycol, polyethylene glycol, dipropylene glycol, polypropylene glycol, dibutylene glycol and polybutylene glycol.

2. A polyurethane as claimed in claim 1, wherein during the reaction there is additionally a component or a mixture of two or more components selected from d) a polyamine or a mixture of two or more polyamines, e) a compound or a mixture of two or more compounds having at least one isocyanate-reactive group and at least one group which is ionizable by addition of base or acid or by quatermization, f) a compound or a mixture of two or more compounds having at least one isocyanate-reactive group and at least one olefinically unsaturated double bond.

3. A process for preparing a polyurethane which is substantially self-dispersible in water, wherein at least, a) polyisocyanates are reacted with b) polyols, and c) photoinitiators of the formula I

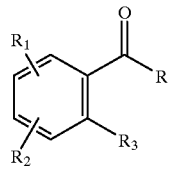

(I)

in which b) and c) are as defined in claim 1, in such a way that the number-average molecular weight M$_n$ of the polyurethane is more than 2700.

4. An aqueous polyurethane dispersion, which comprises at least one polyurethane which is substantially self-dispersible in water and has a number-average molecular weight M$_n$ of more than 2700 and is obtained by reacting a) polyisocyanates with b) polyols, and c) photoinitiators of the formula I

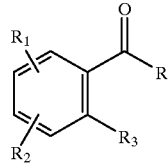

(I)

in which b) and c) are as defined in claim 1.

5. An aqueous polyurethane dispersion as claimed in claim 4, wherein during the reaction a component or a mixture of two or more components is present which are selected from d) a polyamine or a mixture of two or more polyamines, e) a compound or a mixture of two or more compounds having at least one isocyanate-reactive group and at least one group which is ionizable by addition of base or acid or by quatemization, f) a compound or a mixture of two or more compounds having at least one isocyanate-reactive group and at least one olefinically unsaturated double bond.

6. A process for preparing an aqueous polyurethane dispersion, which comprises reacting at least a) polyisocyanates with b) polyols, and c) photoinitiators of the formula I

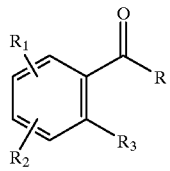

in which b) and c) are as defined in claim 1, with one another and dispersing the product in water.

7. A Process according to claim 6, characterized in that the product is dispersed in water after neutralization.

8. A coating composition obtained by dissolving or dispersing in water at least one polyurethane as claimed in claim 1 together with further polymeric binders and further customary coatings additives.

9. A coating composition obtained by dissolving or dispersing in water at least one polyurethane as claimed in claim 2 together with further polymeric binders and further customary coatings additives.

10. A coating composition obtained by dissolving or dispersing in water at least one polyurethane prepared as claimed in claim 3 together with further polymeric binders and further customary coatings additives.

11. A coating composition obtained by dissolving or dispersing in water at least one polyurethane prepared as claimed in claim 4 together with further polymeric binders and further customary coatings additives.

12. A process for preparing a coating composition, which comprises dissolving or dispersing in water at least one polyurethane as claimed in claim 1 together with further polymeric binders and further customary coatings additives.

13. A process for preparing a coating composition, which comprises dissolving or dispersing in water at least one polyurethane as claimed in claim 2 together with further polymeric binders and further customary coatings additives.

14. A process for preparing a coating composition, which comprises dissolving or dispersing in water at least one polyurethane prepared as claimed in claim 3 together with further polymeric binders and further customary coatings additives.

15. A process for preparing a coating composition, which comprises dissolving or dispersing in water at least one polyurethane prepared as claimed in claim 4 together with further polymeric binders and further customary coatings additives.

16. A process for coating articles, which comprises applying to the article a coating composition as claimed in claim 7 by means of a technique which is customary in coatings technology, first drying said applied composition and then crosslinking it by irradiation with UV rays.

17. A process for coating articles, which comprises applying to the article a coating composition prepared as claimed in claim 8 by means of a technique which is customary in coatings technology, first drying said applied composition and then crosslinking it by irradiation with UV rays.

18. An article coated with an aqueous polyurethane dispersion as claimed in claim 4.

19. An article coated with an aqueous polyurethane dispersion as claimed in claim 5.

20. An article coated with an aqueous polyurethane dispersion prepared as claimed in claim 6.

21. An article coated with a coating composition prepared as claimed in claim 7.

22. An article coated with a coating composition prepared by means of a process as claimed in claim 8.

23. An article coated by means of a process as claimed in claim 9.

\* \* \* \* \*